United States Patent
Kee et al.

Patent Number: 5,280,939
Date of Patent: Jan. 25, 1994

[54] STEERING CONTROL SYSTEMS FOR "C" DOLLIES AND THE LIKE

[75] Inventors: Douglas P. Kee, White City; Randall L. Goulet, Regina; Kirby Goulet, Nepean, all of Canada

[73] Assignee: Advance Engineered Products Ltd., Regina, Canada

[21] Appl. No.: 833,622

[22] Filed: Feb. 7, 1992

Related U.S. Application Data

[63] Continuation of Ser. No. 590,279, Sep. 28, 1990, abandoned.

[30] Foreign Application Priority Data

Sep. 28, 1989 [CA] Canada ................ 613818

[51] Int. Cl.⁵ .................................. B60T 7/12
[52] U.S. Cl. ............................ 280/432; 280/426; 280/411.1; 280/90
[58] Field of Search .......... 280/432, 442, 426, 444, 280/445, 443, 81.6, 411.1, 476.1, DIG. 14, 90

[56] References Cited

U.S. PATENT DOCUMENTS

| | | | |
|---|---|---|---|
| 3,874,696 | 4/1975 | Gardner et al. | 280/475 |
| 4,191,270 | 3/1980 | Monteith | 180/53.4 |
| 4,295,538 | 10/1981 | Lewus | 267/64.15 |
| 4,573,699 | 3/1986 | Smith | 280/DIG. 14 |
| 4,645,226 | 2/1987 | Gustavsson et al. | 280/476.1 |
| 4,730,845 | 3/1988 | Betencourt | 280/804 |
| 4,740,006 | 4/1988 | Ducote | 280/426 |
| 4,759,563 | 7/1988 | Nash | 280/426 |
| 4,768,802 | 9/1988 | Winkler | 280/408 |
| 4,784,400 | 11/1988 | Hofius | 280/6.1 |
| 4,824,155 | 4/1989 | Jacobsen | 294/97 |
| 4,841,872 | 6/1989 | Wicks et al. | 280/408 |
| 4,853,173 | 8/1989 | Odlen et al. | 364/426 |

FOREIGN PATENT DOCUMENTS

| | | | |
|---|---|---|---|
| 0126387 | 11/1984 | European Pat. Off. | 280/81.6 |
| 0779152 | 11/1980 | U.S.S.R. | 280/81.6 |

*Primary Examiner*—David M. Mitchell
*Assistant Examiner*—Paul Dickson
*Attorney, Agent, or Firm*—Morrison & Foerster

[57] ABSTRACT

In "C" dolly systems, it is conventional to provide a resistance to steer of approximately 0.3 G in order to improve the steering thereof particularly in an evasive action and to decrease the tendency of high speed off tracking. The higher this resistance to steer, the better the high speed off tracking characteristics are. However, high resistance although relatively satisfactory at high speeds, at relatively low speeds below approximately 30 miles an hour, results in the creation of severe and undue stresses and forces in the dolly and hitch structures particularly during relatively tight turning maneuvers. The present invention comprises a two phase control system. The speed of the vehicle is sensed continuously and when the speed is below approximately 30 mph (approximately 50 kph) the steering axle of the dolly is free to steer under the control of the axle steering dampening system but above 30 mph (50 kph), the axle is locked thus giving the maximum resistance to steer. It is desirable that a signal generated by the control system holds the locking mechanism out of engagement below approximately 30 mph and allows it to lock when the signal is removed at above approximately 30 mph thus providing a fail-safe feature. It is also desirable that the system does not reengage until the speed drops approximately 5 mph below the cut-out speed in order to prevent rapid cycling when travelling at approximately the cut-out speed.

14 Claims, 5 Drawing Sheets

STEERING CONTROL SYSTEMS FOR "C" DOLLIES AND THE LIKE

This application is a continuation of application Ser. No. 07/590,279, filed Sep. 28, 1990 now abandoned.

This invention relates to new and useful improvements in steering control systems for "C" dollies and the like in vehicle trains.

BACKGROUND

When a "C" dolly is used in conjunction with the standard "A" train vehicle configuration it creates a new configuration called a "C" train which has one less point of articulation in the vertical plane than an "A" train. As a result, this is a much more stable and controllable configuration.

As a result of testing, it has been demonstrated that the amount of resistance to steer due to side forces on a dolly of this type is extremely critical at high speeds. When the vehicle is in an evasive maneuver, a dolly with a relatively small amount of resistance to steer, due to side forces, will contribute to high speed off tracking of the rear vehicle (possibly intruding into a lane of oncoming traffic). The higher the resistance to steer, the better are the high speed off-tracking characteristics of the complete "C" train configuration. Ideally, the dolly steering should be locked at high speeds so that it becomes a fixed axle. Steering is not required at higher speeds since speeds over approximately 30 mph (50 kph) do not normally include relatively sharp or violent turning maneuvers. These usually occur at relatively low speeds.

The industry has attempted to develop a dolly with a resistance to steer of approximately 0.3 G. This means that if there is approximately 20,000 pounds of load on the tires at ground level, the axle could not steer more than one degree off centre in either direction when a force equivalent to approximately 6,000 pounds was applied to the tires perpendicular to the longitudinal axis of the dolly and "C" train configuration. Although this criterion greatly improves the high speed off-tracking characteristics of the "C" train unit, it also results in a high resistance to steer at low speeds (for example below 30 mph) which creates severe and undue stresses and forces in the dolly and its structure, particularly during tight turning maneuvers. It has been noted that in such situations, the forces are so high that the tires are nearly being forced off the rims of the "C" dolly.

SUMMARY

The present invention addresses this problem by providing what might be termed a two phase control system activated by the speed of the dolly.

In accordance with one aspect of the invention there is provided a steering control system for a vehicle dolly which includes a dolly frame, at least one pair of wheels, and wheel mounting means mounting the wheels on opposite sides of the frame, the mounting means including wheel steering means supporting the wheels for steering movement thereof, said control system comprising;

signal generating means responsive to rotation of the wheels for generating a speed signal representing the speed rotation of the wheels with respect to the frame;

signal processing means receiving the speed signal and generating a lock signal whenever the speed signal represents a speed in a predetermined range of speeds; and lock means for selectively locking the wheel steering means to prevent steering movement of the wheels, the lock means being actuable in response to actuation of the lock signal.

The invention also provides a vehicle dolly incorporating the control system.

According to another aspect of the invention there is provided a kit for retrofitting purposes for a steering control system for "C" train dollies and the like, said kit comprising (a) a signal generator for sensing the speed of rotation of one of the wheels of the dolly, (b) a computer module receiving and counting said signals and generating an output when said signals exceed a predetermined number per minute, (c) a pneumatic circuit operatively connected to a source of pneumatic pressure and including a pair of lines operatively connected to a double acting piston and cylinder assembly, (d) a normally closed solenoid operated valve in one of said lines leading to one side of said double acting piston and cylinder, and actuable to an open condition in response to the generation of said output by the computer module, (e) a normally open solenoid operated valve in the other of said lines leading to the other side of double acting piston and cylinder, and actuable to a closed condition in response to generation of said output by the computer module, (f) and a steering lock assembly operatively connected to said double acting piston and cylinder for locking the steering of said dolly when said relay is inactivated and maintaining said steering of said dolly in the unlocked condition when said relay is activated.

The presently preferred embodiment of the invention includes a computer module incorporating a relay which emits a signal until such time as the wheel speed exceeds approximately 250 RPM. This is approximately equivalent to 30 mph. At this point it is desirable that the module ceases to send the activating signal thus opening the relay contacts and cutting the flow of power to the solenoid operated valves in the system.

This will effectively cause the steering axle of the dolly to be locked at speeds over 30 mph. Should the system fail the axle would automatically be locked at any speed. It is also preferable that the computer module is designed so that it does not reengage the relay until such time as the wheel speed drops to approximately 210 RPM (approximately 25 mph). This will prevent the locking action from cycling in and out unnecessarily if the unit happens to be operating at a speed close to 30 mph.

Embodiments of the invention may be incorporated in new manufacture or may be retrofitted to existing "C" trains or the like.

BRIEF DESCRIPTION OF THE DRAWINGS

In the accompanying drawings, which illustrate an exemplary embodiment of the present invention.

DETAILED DESCRIPTION

Figure 1:
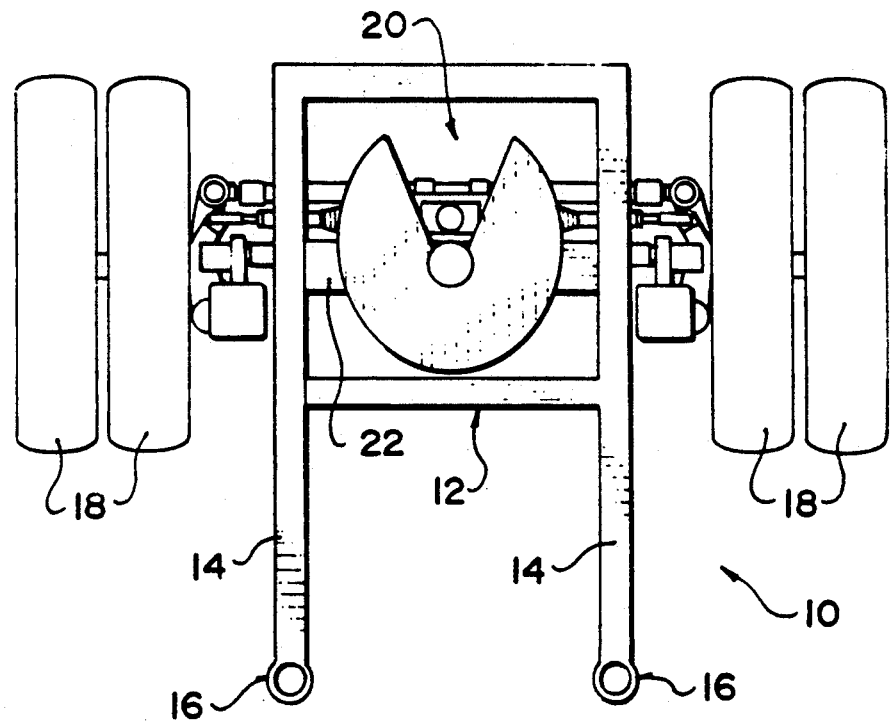
FIG. 1 is a plan view of a "C" Dolly.

Referring to the accompanying drawings, especially to FIG. 1, there is illustrated a dolly 10 having a frame 12 with two tongues 14. The leading end of each tongue is equipped with a ring 16 to be engaged with a pintle hook on a towing vehicle. The frame is supported on four rubber tired wheels 18, two on each side of the frame. At the center of the dolly is a fifth wheel 20 for carrying the leading end of a trailer.

Figure 2:
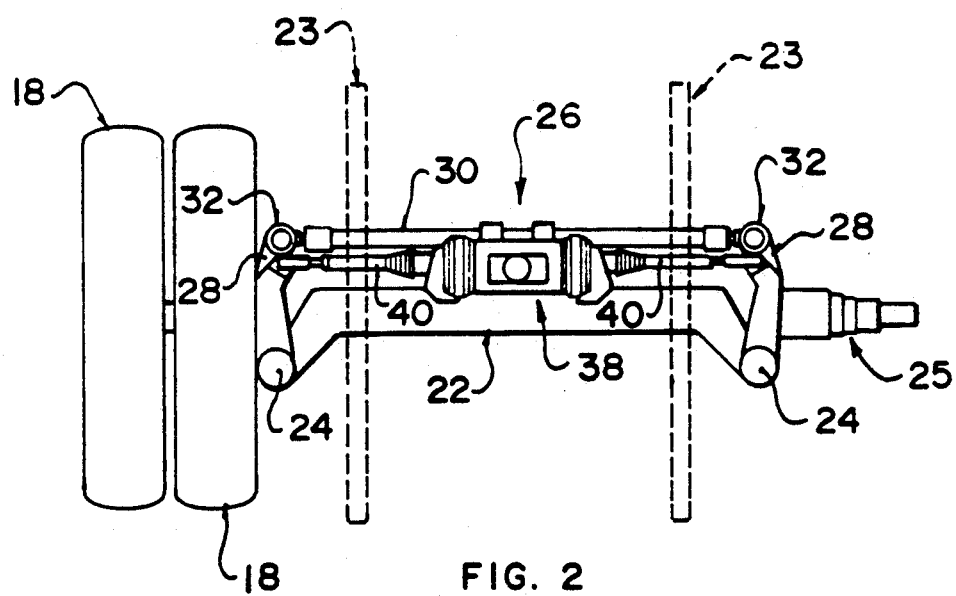
FIG. 2 is a plan view of an axle assembly.

FIG. 2 of the drawings illustrates the axle assembly for the dolly. This includes an axle 22 on which the dolly frame is mounted through leaf springs 23. At each end of the axle 22 is a steering knuckle 24 which carries a wheel mounting spindle 25. The two spindles are connected with an Ackerman linkage 26 to control the steering movements of the two sets of wheels. The linkage includes arms 28 on the two spindles and a tie rod 30 with pivotal connections 32 to the respective arms 28. The arms 28 are also connected to an air torpress 38 by a pair of links 40. This is a damping mechanism that provides a controlled steering resistance.

Figure 5:
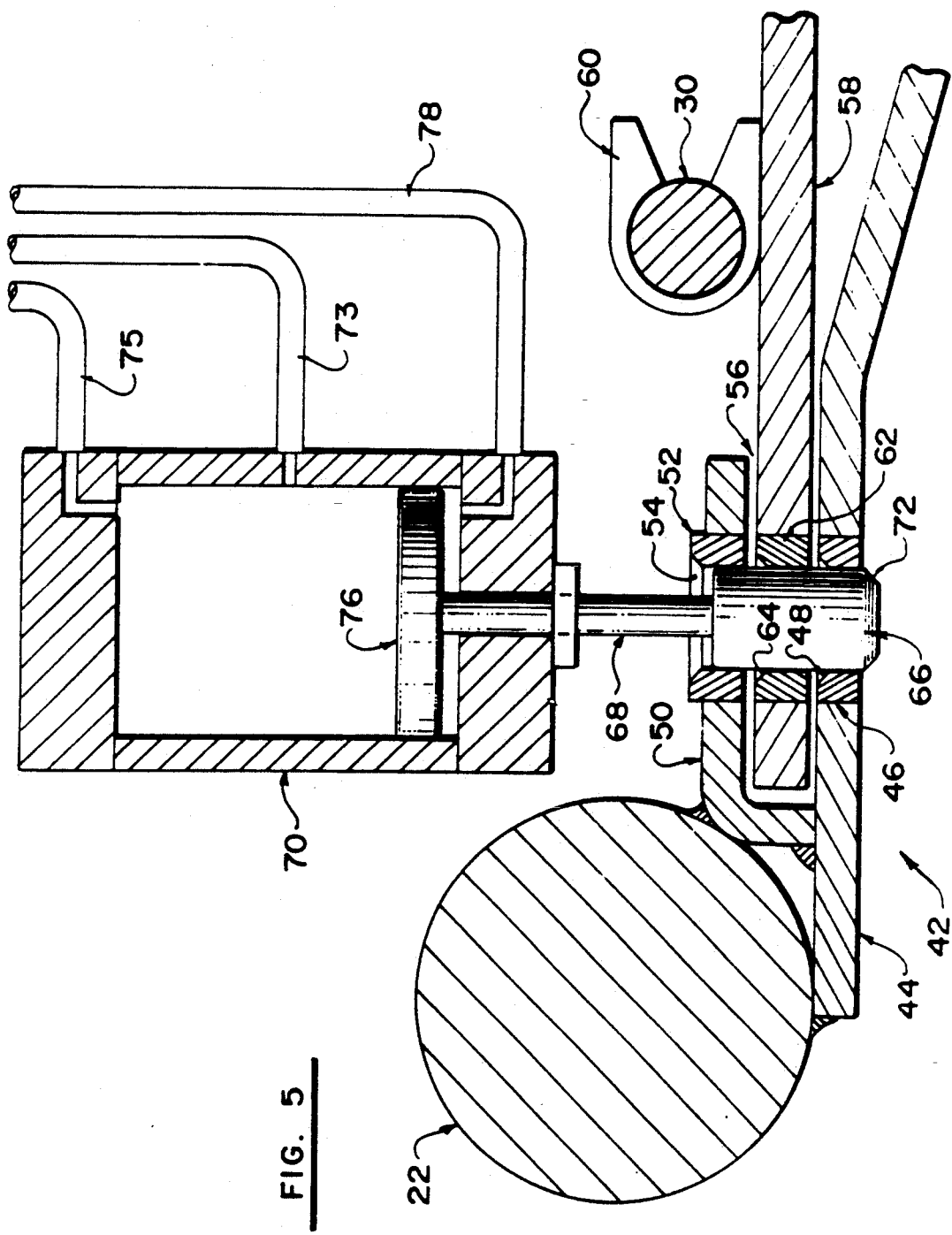
FIG. 5 is a fragmentary side cross-sectional view of the axle lock portion of the device.
Figure 6:
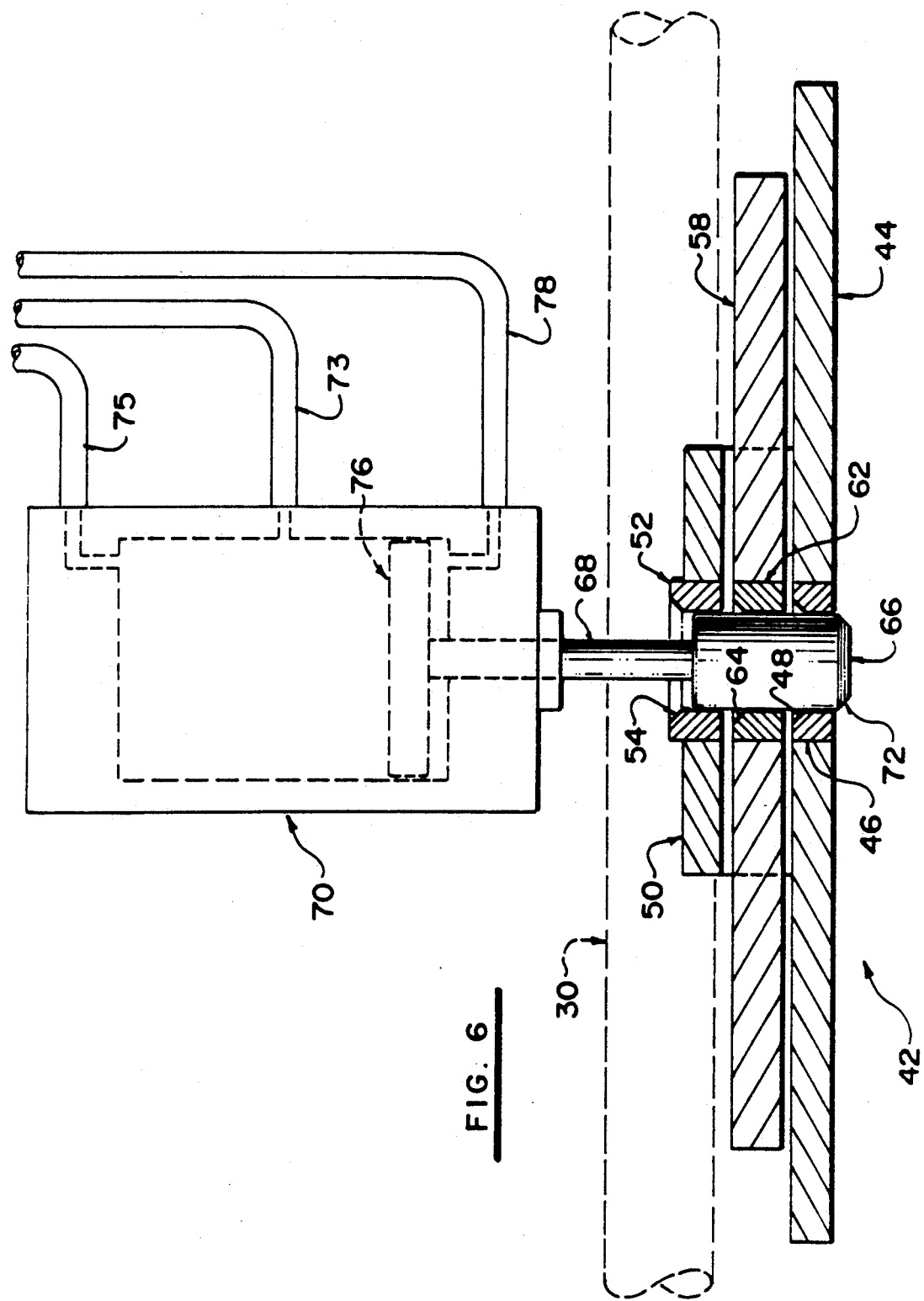
FIG. 6 is a rear view of FIG. 5.

The steering mechanism illustrated in FIG. 2 is self steering. It is particularly useful at low speed when sharp turns and evasive maneuvers can be encountered. At higher speeds, say over 30 mph, a high steering resistance is desired. To achieve this, a control system is incorporated into the present C dolly to lock the steering at higher vehicle speeds. The lock mechanism is illustrated most particularly in FIGS. 5 and 6. The steering lock 42 includes a base plate 44 that is fixed to the axle and extends partially along its length. The base plate carries a bushing 46 with a chamfer 48 at the upper edge of its bore. A top plate 50 is also mounted on the axle and extends over the center part of the base plate 44. The top plate carries a bushing 52 aligned with the bushing 46. The bushing 52 also has a chamfer 54 at the top inner edge. The two plates 50 and 44 act to define a channel 56 extending along the rear of the axle 22.

Sliding in the channel 56 is a plate 58 secured to the tie rod 30 by brackets 60. As illustrated most particularly in FIG. 6, the plate 58 carries a bushing 62 with a chamfer 64 at its top inner edge. The plate 58 is locked to the top plate 50 and base plate 44 by a lock pin or plunger 66 mounted on the end of the piston rod 68 of an air cylinder 70. The leading end of the plunger 66 has a chamfer 72 which cooperates with the chamfers on the bushings 46, 52 and 62 to guide the plunger into place when the cylinder 70 is extended. When the plunger is withdrawn from the bushings, the plate 58 is free to slide along the base plate 44, freeing the tie rod to allow steering movement of the wheels.

The position of the lock pin 66 is monitored using a pneumatic electric switch 71 coupled to the air line 73 supplying the "locked" side of the cylinder 70 and a second pneumatic electric switch 74, coupled to an air line 75. The line 75 is tapped into cylinder 70 at the point that the piston 76 passes when moving to lock the axle. Switches 71 and 74 are connected electrically in series with a 12 volt supply and a "locked" indicator lamp 77. Each switch is normally open (off) and closes when it senses a pressure over 55 psi. In the locked condition, both switches sense high pressure, both are closed and the indicator lamp 77 is on. When the axle is unlocked, air pressure is removed from line 73 and applied to the line 78 supplying the unlocked side of cylinder 70. This removes pressure from both switches 71 and 74 until the piston passes the line 75, which is then pressurized to close switch 74. Switch 71 remains open. On locking the axle, pressurized air is supplied to line 73, while line 78 is exhausted. Switch 71 is closed and switch 74 opened. When the pin 66 moves into the locked position, pressure is applied to line 75 and switch 74 closes to power lamp 77 to provide a visual indication of when the steering is locked.

Figure 3:
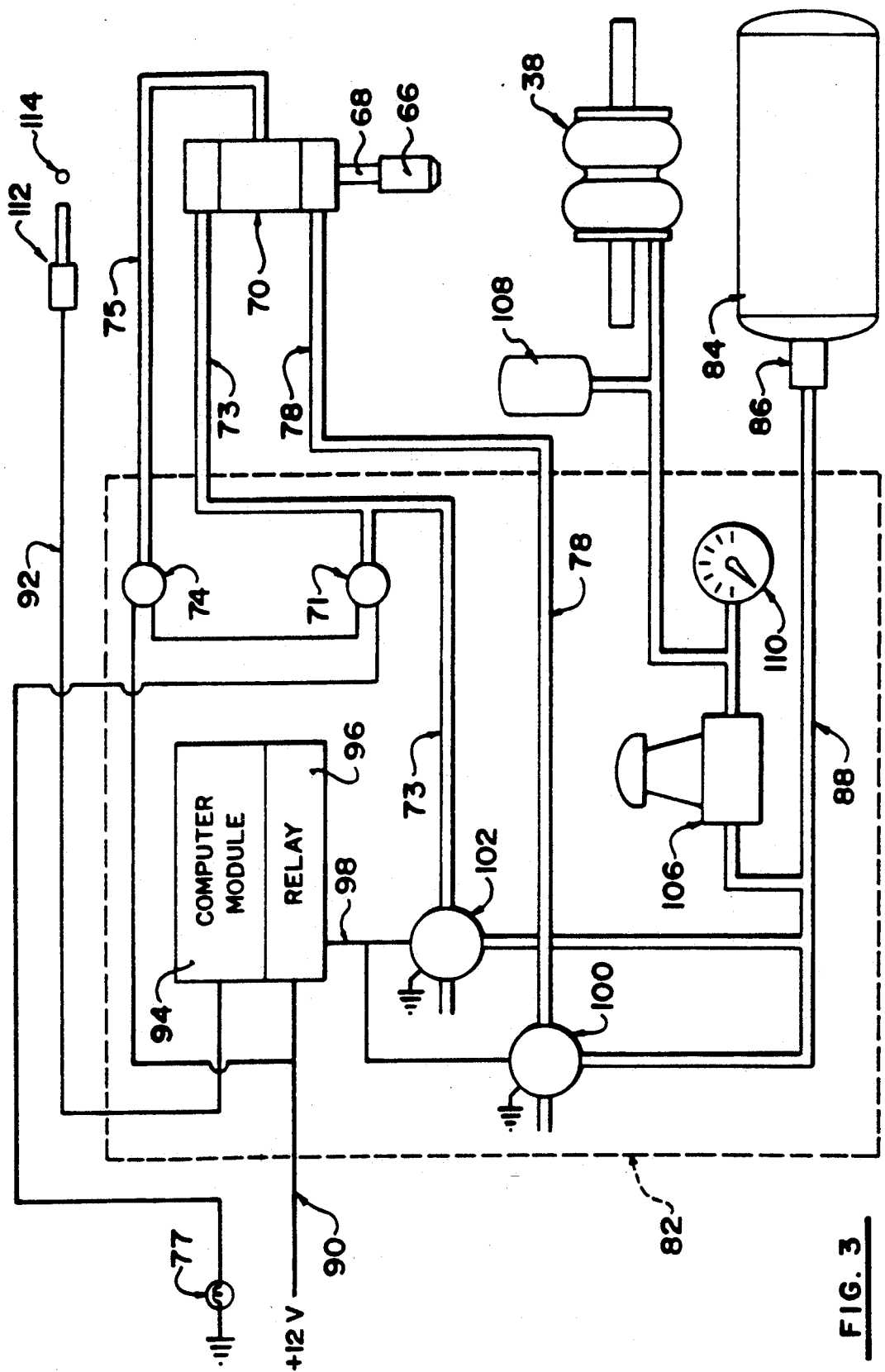
FIG. 3 is a schematic of the "C" dolly steering control system.

The steering lock is controlled with a pneumatic system illustrated schematically in FIG. 3. Illustrated in the drawing is a control housing 82 that accommodates various of the control components. Outside of the housing is an air reservoir 84 supplying pressurized air to the control housing through a pressure protector valve 86 and an air line 88. The control housing has an electrical supply 90 supplying +12 volts DC for operating the electrical system. Also leading into the control housing is a speed signal line 92.

Within the control housing 82 is a control module 94 that receives wheel speed signals from the speed signal line 92 and controls the operation of a relay 96. The relay output 98 is supplied to two solenoid air valves 100 and 102. Valve 100 is a normally closed valve, opening in response to the presence of a signal at the relay output. The valve 102 is a normally opened valve that closes in response to the presence of a signal at the relay output. Each of the valves 100 and 102 is supplied with air pressure from the air line 88. The air outlet of valve 100 is connected to the bottom end of cylinder 70, while the output of valve 102 is connected to the top end of the cylinder. With this arrangement, the normal condition of the cylinder is with the piston down and the plunger 66 extended to lock the steering. To release the steering there must be a positive voltage present at the relay output 98.

Air from the reservoir 84 is also passed through a pressure regulator 106 to the air torpress 38. An air expansion chamber 108 and a pressure gauge 110 are connected to the line leading from the pressure regulator to the torpress.

Figure 4:
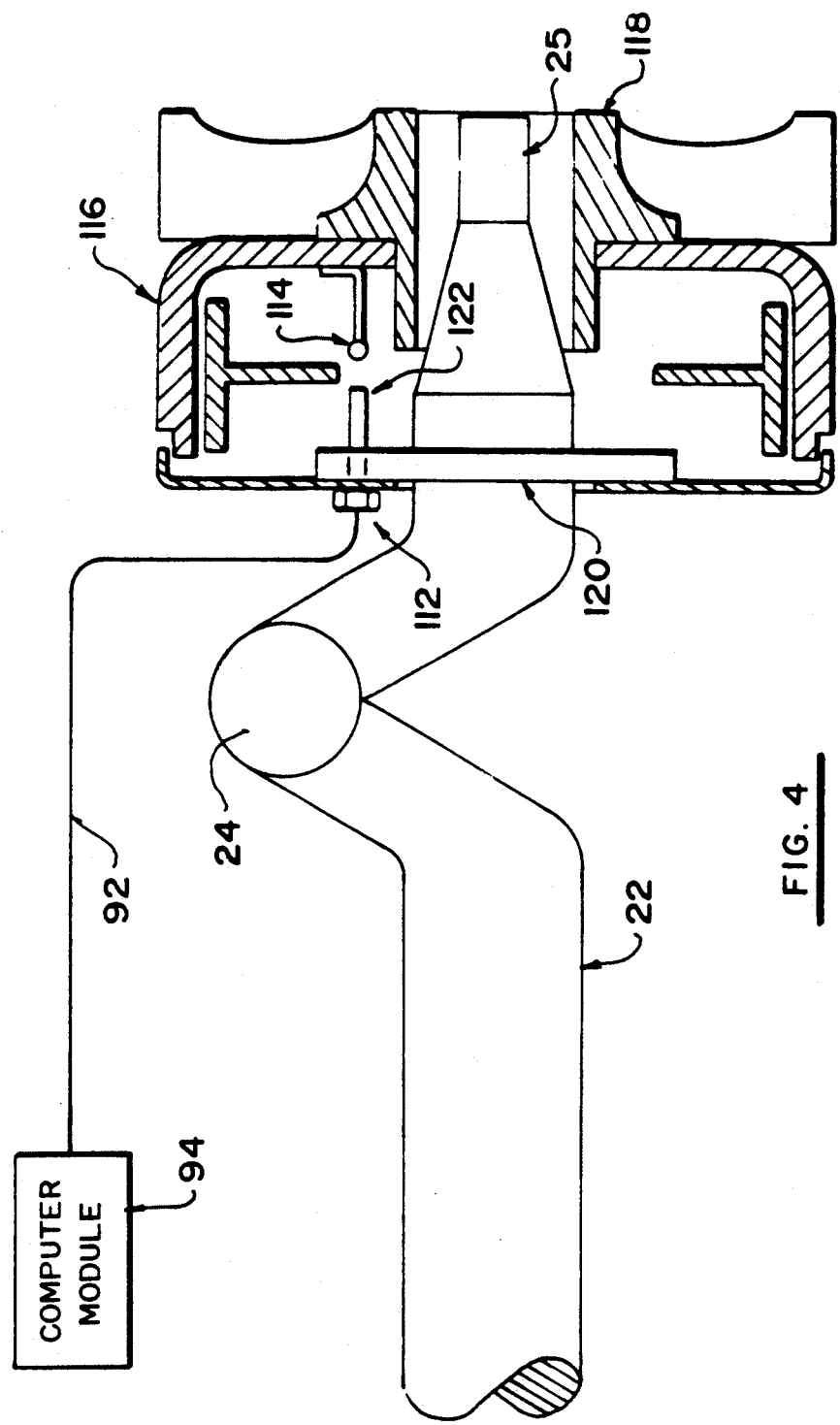
FIG. 4 is a fragmentary view of the wheel speed sensor per se.

The speed sensor that is used to supply wheel speed signals to the control module 94 is illustrated most particularly in FIG. 4. The speed sensor 112 includes a magnet 114 mounted on a brake drum 116 of a wheel hub 118. The wheel hub is mounted on one of the spindles 25. The magnet is located within the brake drum. Mounted on a brake anchor flange 120 on the spindle 25 is a magnetically responsive switch 122. The arrangement is such that as the wheel rotates, the magnet 114 passes the switch 122 once each revolution to produce a pulsed signal, the frequency of which represents the speed of rotation of the wheel. The signal from the switch 122 is fed to the control module 94 for control purposes.

The control module 94 acts to close the relay 96, thus opening valve 100 and closing valve 102 in response to a signal frequency below about 4.17 Hz, which corresponds to a wheel speed of about 250 RPM. This corresponds in turn to a low speed range up to about 30 mph. This actuation of the two valves draws the plunger from the steering lock, so that the steering in unlocked at these low speeds. When the speed signal from the switch reaches a frequency indicating a speed above the threshold level set by the module 94, the relay is allowed to open, removing the signal from the relay output 98 and allowing the valves 100 and 102 to return to their normal condition. This extends the air cylinder 70, which will bias the plunger towards the locked position until the bushing 62 comes into alignment with the bushings 52 and 46. At that time, the cylinder will extend to the locked position illustrated in FIGS. 5 and 6, preventing further movement of the tie rod with respect to the axle and locking the steering.

As vehicle speed is reduced, the frequency of the signal from the magnetically responsive switch also decreases. When the control module detects a frequency of 210 RPM, representing a second predetermined speed of 25 mph, which is less than the lock engaging speed, it actuates the relay to supply power to the solenoid valves 100 and 102, thus disengaging the lock and freeing the steering system. The steering is unlocked at a speed below the locked engaging speed in order to prevent a rapid and frequent cycling of the lock when the vehicle speed is travelling at about the locked engaging speed.

While one particular embodiment of the present invention has been described in the foregoing, it is to be understood that other embodiments are possible within the scope of the invention and are intended to be included within the scope of the appended claims. Thus, for example, the exemplary embodiment is described in conjunction with a self steering axle steering system. The invention is also applicable to a "C" Dolly with a castering turntable steering. Other embodiments will be apparent to those knowledgeable in the art.

We claim:

1. In a vehicle train comprising a towing vehicle, a lead trailer coupled to the towing vehicle and a following trailer coupled to the lead trailer, a vehicle dolly coupling the following trailer to the lead trailer, said dolly comprising:

a dolly frame,
   means coupling the dolly frame to the lead trailer for preventing relative horizontal turning of the lead trailer and the dolly,
   at least one pair of wheels,
   wheel mounting means mounting the wheels on opposite sides of the frame, the mounting means including wheel steering means supporting the wheels for self-steering movement thereof, and
   a steering control system comprising:
   signal generating means responsive to rotation of the wheels for generating a speed signal representing the speed rotation of the wheels with respect to the frame;
   signal processing means receiving the speed signal and generating a lock signal whenever the speed signal represents a speed in a predetermined range of speeds; and
   lock means for locking the wheel steering means to prevent steering movement of the wheels, the lock means comprising:
   a pneumatic circuit operatively connected to a source of air under pressure and including a pair of air lines, a double acting piston and cylinder operatively connected to the lines, and valve means for alternatively opening and closing the lines,
   a steering lock assembly operatively connected to the piston and cylinder for selectively locking the steering of the dolly, and
   valve operating means for operating the valve means in response to the lock signal.

2. A train system according to claim 1 wherein the lock means have a locked condition locking the steering means and a release condition releasing the steering means, the lock means being normally in the locked condition and responsive to presence of the lock signal to adopt the release condition.

3. A train according to claim 2 wherein the signal processing means are responsive to a speed signal representing a speed less than a first predetermined speed for generating lock signal.

4. A train according to claim 3 wherein the signal processing means are responsive to a speed signal representing a speed greater than a second predetermined speed for discontinuing the lock signal, the second predetermined speed being greater than the first predetermined speed.

5. A train according to claim 1 wherein the signal generating means comprise a magnet mounted on one of the wheels for rotation therewith and a magnetically responsive means non-rotatably mounted in a position to detect the passage of the magnet in each wheel rotation.

6. A train according to claim 1 including an axle, means mounting the axle on the frame and means mounting the wheels on opposite ends of the axle for steering movement thereon.

7. A train according to claim 6 wherein the wheel steering means include knuckle means at each end of the axle, mounting the respective wheels for steering movement on the axle.

8. A train according to claim 7 including tie rod means linking the wheels on opposite sides of the frame.

9. A train according to claim 8 wherein the lock means comprise a stationary lock component mounted on the axle, a moveable lock component mounted on the tie rod, and means for selectively locking the stationary and moveable components together.

10. A train according to claim 9 wherein the lock means comprise a stationary lock plate mounted on the axle, a first aperture in the stationary lock plate, a moveable lock plate mounted on the tie rod to slide over the stationary plate in steering movement of the wheels, a second aperture in the moveable lock plate and a plunger engageable with the first and second apertures.

11. A train according to claim 10 including a second stationary lock plate mounted on the axle, the moveable lock plate sliding between the first and second stationary lock plates.

12. A train according to claim 10 wherein the plunger is moveable between a locked position engaging the first and second apertures and a release position out of engagement with the first and second apertures.

13. A train according to claim 12 including detector means for detecting the presence of the plunger in the locked position.

14. In a vehicle train comprising a towing vehicle, a lead trailer coupled to the towing vehicle and a following trailer coupled to the lead trailer, a vehicle dolly coupling the following trailer to the lead trailer, said dolly comprising:

a dolly frame
   means coupling the dolly frame to the lead trailer for preventing relative horizontal turning of the lead trailer and the dolly,
   at least one pair of wheels,
   wheel mounting means mounting the wheels on opposite sides of the frame, the mounting means including wheel steering means supporting the wheels for self-steering movement thereof, and
   a steering control system comprising:

signal generating means responsive to rotation of the wheels for generating a speed signal representing the speed rotation of the wheels with respect to the frame;

signal processing means receiving the speed signal and generating a lock signal whenever the speed signal represents a speed in a predetermined range of speeds; and lock means for locking the wheel steering means to prevent steering movement of the wheels, the lock means comprising:

(a) a control module receiving said speed signal and generating output when said speed signal represents a speed less than a predetermined speed, (b) a pneumatic circuit operatively connected to trailer coupled to the towing vehicle and a following trailer coupled to the lead trailer, a vehicle dolly coupling the following trailer to the lead trailer, said dolly comprising:

a dolly frame

* * * * *